United States Patent [19]

Obenshain

[11] 4,045,038

[45] Aug. 30, 1977

[54] HOLLOW CORE CHUCKING DEVICE

[75] Inventor: David Noel Obenshain, Swanton, Md.

[73] Assignee: Westvaco Corporation, New York, N.Y.

[21] Appl. No.: 719,158

[22] Filed: Aug. 31, 1976

[51] Int. Cl.² ............... B23B 31/40; B65H 75/24
[52] U.S. Cl. ................................. 279/2 R; 82/44; 242/68.4; 269/48.1
[58] Field of Search ............ 279/2 R, 2 A; 269/48.1; 242/68, 68.2, 68.4, 73; 82/44

[56] References Cited

U.S. PATENT DOCUMENTS

| 859,492 | 7/1907 | Forsberg | 242/68.2 |
| 1,402,060 | 1/1922 | Fisher | 242/68.4 |
| 1,411,292 | 4/1922 | Mueller | 242/68.2 X |
| 3,430,887 | 3/1969 | Elsner et al. | 242/68.2 |

Primary Examiner—Othell M. Simpson
Assistant Examiner—Z. R. Bilinsky

[57] ABSTRACT

The chucking device of the present invention comprises a tapered chuck plug with an elongated slot formed in the tapered end thereof into which a pair of core engaging chuck dogs are mounted. The chuck dogs are normally spring biased into a retracted position within the confines of the chuck plug but can be mechanically actuated to project from their slot outside the confines of the chuck plug to firmly grip the insides of a hollow core.

2 Claims, 6 Drawing Figures

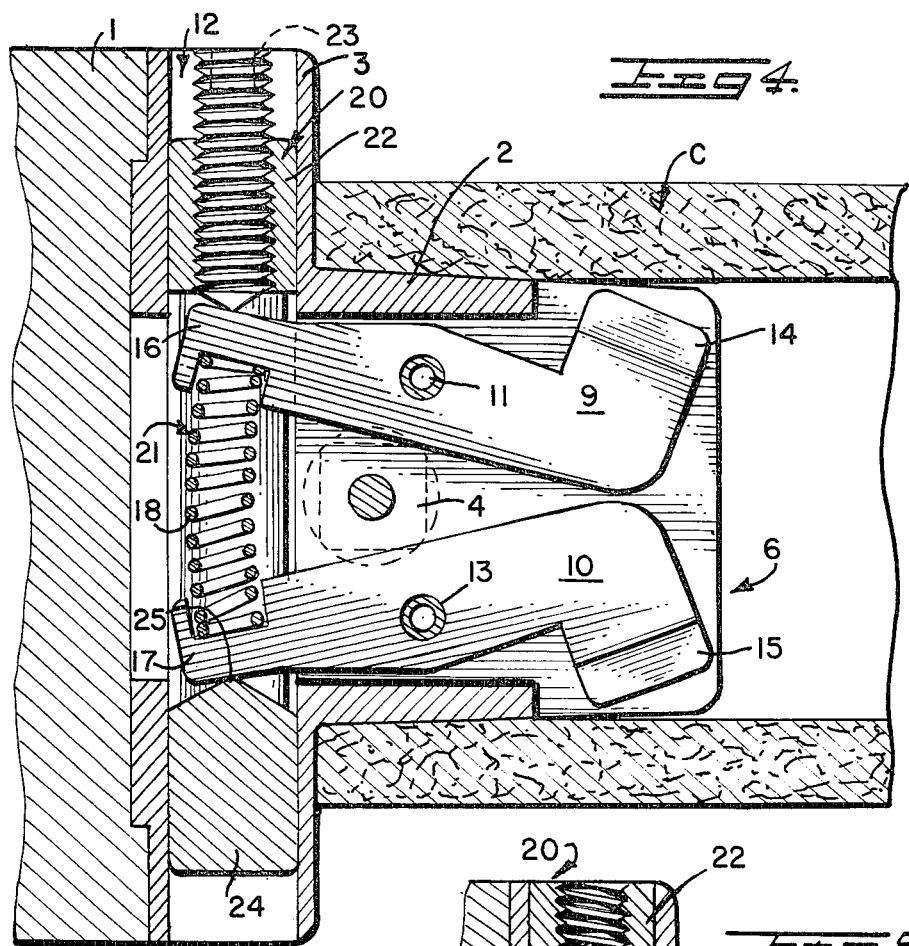
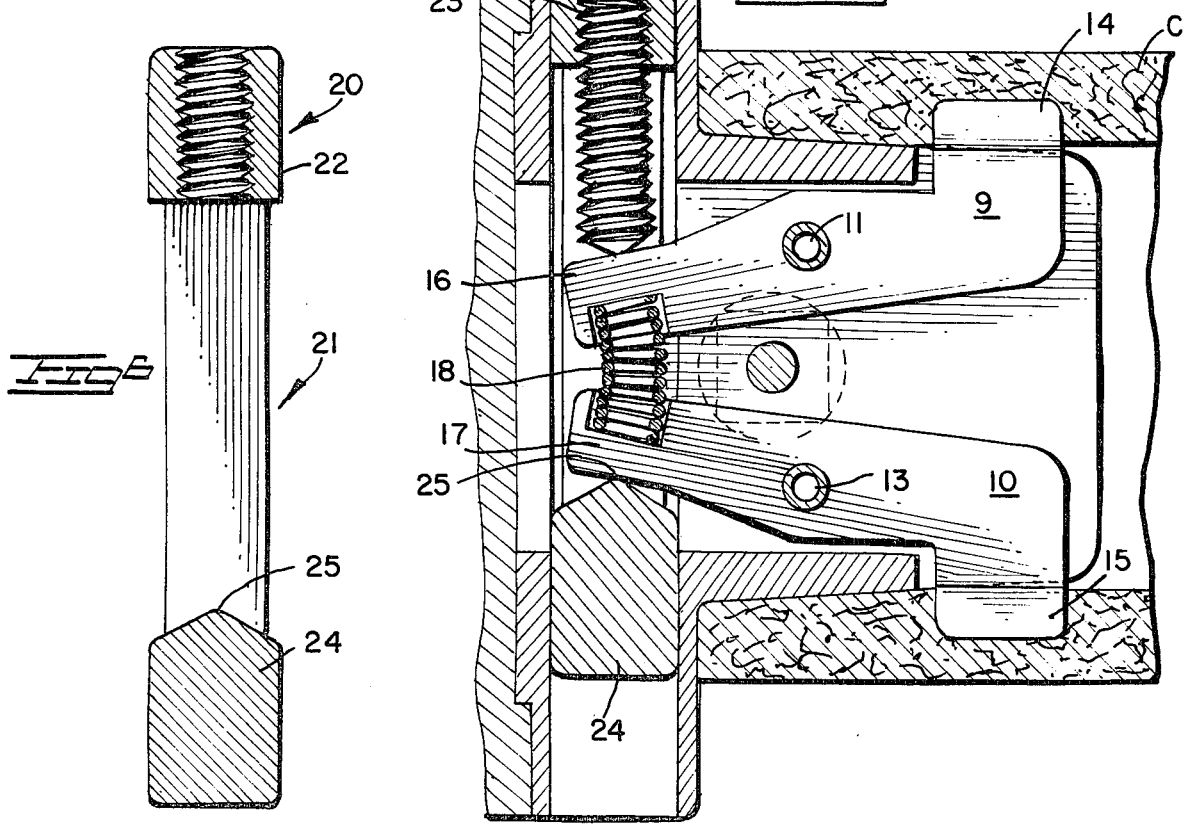

HOLLOW CORE CHUCKING DEVICE

BACKGROUND OF THE INVENTION

The present invention deals with an improved tapered core chuck for hollow cores, particularly as used with rolls of paper, but not limited thereto.

In the paper, printing and allied industries, paper or other sheet material in web form is usually handled in the form of rolls of the material that is wound onto hollow fiber or plastic cores. These cores usually have a notch or key opening in one or both ends for engagement with a key or keys that are mounted on the core chucks or plugs which fit into the ends of the core. The cores in this condition can thus be used for winding or unwinding the material. However, with the typical fiber cores normally used in the paper industry, more often than not the core ends are damaged or the key slots are multilated which renders the conventional keyed, tapered core chuck unsatisfactory for keeping the core firmly in place during winding and unwinding. In addition, the cores are generally not precisely sized so that the internal diameter of the cores from unit-to-unit varies, further complicating the ability to get the cores fixed on the standard sized core chucks.

To overcome these problems, a number of different alternatives have been proposed including expanding chucks, tapered chucks with fluted surfaces and chucks with internal locks which tilt into locked position. However most of these efforts have resulted in core chucks that are quite expensive, difficult to maintain and use, and very simply not completely satisfactory in performance.

Examples of some of the prior art core chucks are exemplified in the following list of U.S. Pat. Nos.
  1,402,060
  2,922,592
  3,368,769
  3,704,837

As will be seen from studying the above noted U.S. Pat. Nos. 1,402,060, 2,922,592 and 3,704,837 each work on the principle whereby the core locking devices are forced into position automatically by mechanical action as the core is inserted on the chuck, while applicant's prior U.S. Pat. No. 3,368,769, uses a floating key arrangement for accomodating different sized cores. In contrast to these and other prior art core chucks, the core chuck of the present invention utilizes chuck dogs that are normally spring biased into a retracted condition, but which can be engaged into the hollow core by a separate mechanical action not inherent with the placing of the core on the chuck. Moreover, it will be seen that the core chuck of the present invention is particularly useful with damaged cores and further satisfies a need for a simple and expedient device of rugged construction.

SUMMARY OF THE INVENTION

The core chuck of the present invention consists essentially of a tapered chuck plug with a generally cylindrical, tapered body portion integral with an enlarged base portion that is mounted on the rotatable spindle of a winding or unwinding device. The chuck plug includes an elongated slot that extends internally thereof from the base portion, to the tapered end where the slot opens into the surface face of the plug. Mounted in the slot for pivotal movement from a condition retracted into the plug to a condition exteriorly of the plug are a pair of chuck dogs for firmly engaging and retaining a hollow core on the core chuck. The chuck dogs are shaped at one end to accept and retain a compression spring which normally urges the dogs into their retracted condition and are shaped at the opposite end with sharpened points for engaging the interior surfaces of the hollow cores. A mechanical actuation means is provided in the base portion of the core chuck in the region of the chuck dogs and compression spring which can be actuated to work against the force of the spring and urge the sharpened surfaces of the chuck dogs into the core. In particular, the chuck dogs are generally only required for those cores that are oversize for the chuck plug being used or for damaged cores, however, the device of the present invention clearly provides an economical and simple to operate chucking device with a rugged construction for use with any hollow core.

DESCRIPTION OF DRAWING

FIG. 4 is a side view in cross-section of the core chuck of FIG. 1 with the chuck dogs and the chuck dog actuation mechanism added;

FIG. 5 is a view similar to FIG. 4 with the chuck dogs engaged in a core element; and, FIG. 6 is a side view in section showing the details of the slide actuator of the present invention.

DETAILED DESCRIPTION

Figure 1:
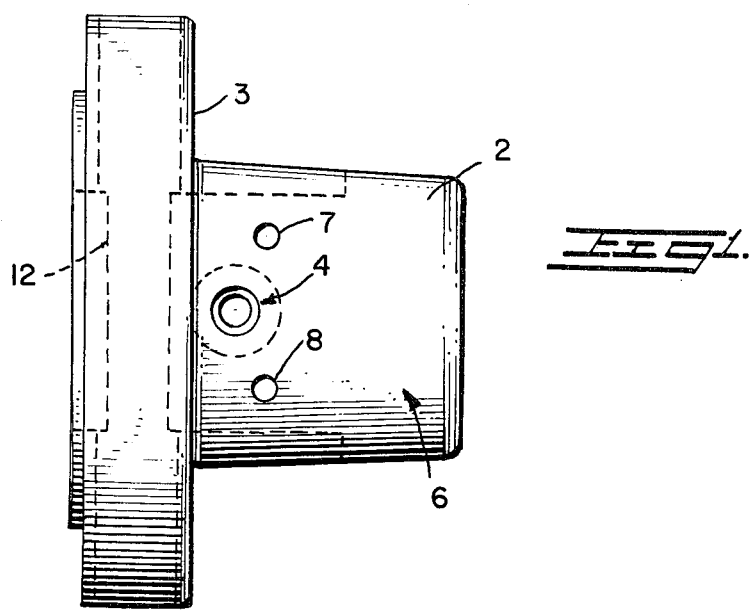
FIG. 1 is a side view of a typical core chuck adapted for the present invention.
Figure 2:
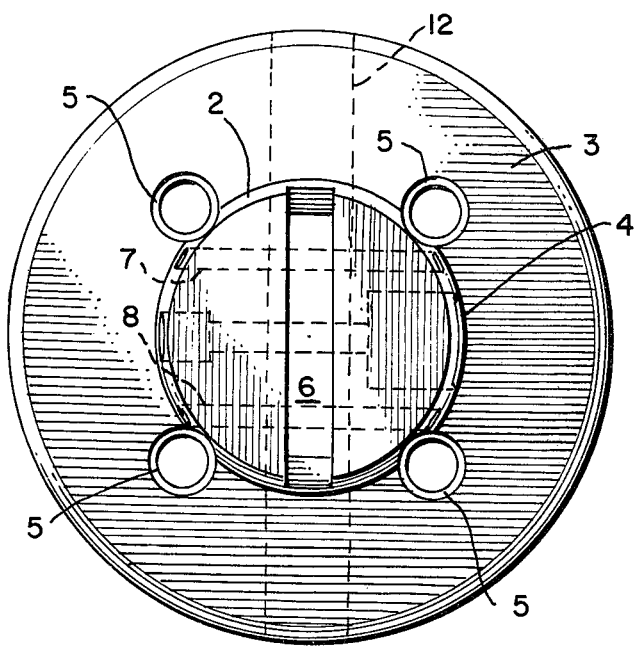
FIG. 2 is a front view of the core chuck of FIG. 1.
Figure 3:
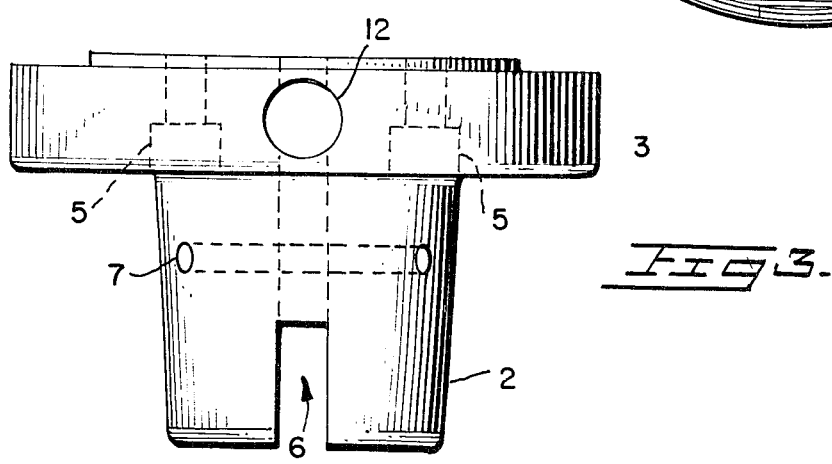
FIG. 3 is a top view of the core chuck of FIGS. 1 and 2.

FIGS. 1, 2 and 3 illustrate the side, front and top views of a core chuck adapted for the present invention. With reference to the above noted views, the core chuck may be seen to comprise a chuck plug 2 having a generally cylindrical and tapered body portion integral with an enlarged base portion 3. The chuck plug 2 is dimensioned to accomodate cores having a nominal diameter of about three inches. As a general rule, the cores are made of paper fiber or plastic and include in the ends thereof a notch or key opening (not shown) that engages a key element or the like 4 on the core supporting chuck plug. The base portion 3 of the core chuck is bored horizontally at several locations 5 for convenience in mounting the core chuck to the spindle (not shown) of a piece of machinery for handling rolls of material. The base portion 3 also includes a vertically oriented bore 12 for accomodating the actuating means for the chuck dogs described hereinafter.

The chuck plug portion 2 of the core chuck includes an elongated slot 6 that extends internally of the chuck plug from its base portion 3 to the extreme tapered end thereof where the slot opens into the surface face of the chuck plug. The elongated slot is provided in the chuck plug for the purpose of mounting the core engaging chuck dogs described hereinafter. In this regard, the chuck plug 2 also includes a second pair of bores 7, 8 perpendicular to the slot 6 which are adapted to hold pins on which the chuck dogs are pivotally mounted.

FIG. 4 shows in cross section a side view of the core chuck illustrated in FIG. 1 with the chuck dogs and their actuation mechanism. FIG. 4 also shows the base portion 3 of the core chuck suitably mounted on a spindle element 1 using the bores 5 provided therefor and a core element C mounted on the chuck plug. The core element C illustrated is typical of those used in the paper industry being made of paper fiber and having a nominal inside diameter of about three inches. Generally, the cores can be adequately retained on the core chuck with the aid of a key 4 provided thereon and the key slot (not shown) formed in the core element. However, in those cases where the key slot is worn or for some other reason the core does not fit snugly on the core plug, the device of the present invention is used. As shown in FIG. 4, the present invention utilizes a pair of chuck dogs 9,10 located in the elongated slot 6 of chuck plug 2 and mounted on pins 11,13 that are disposed in the bores 7,8 of chuck plug 2. The chuck dogs 9,10 are generally aligned with one another in slot 6 for pivotal movement from a normal position within the confines of the chuck plug as shown in FIG. 4, to a core engaging position as shown in FIG. 5. The chuck dogs 9,10 each comprise elongated, angular hardened tool steel elements that are sharpened at the ends 14 and 15 which lie in the open part of slot 6 and which are shaped at the ends 16 and 17 which lie in the area provided therefor in bore 12 of base portion 3. The shaped ends 16,17 of chuck dogs 9,10 are dimensioned to accomodate the ends of a compression spring device 18 that urges the ends 16,17 away from one another and the ends 14,15 toward their retracted condition within chuck plug 2. For the purpose of actuating the chuck dogs 9,10 into their core engaging condition, an actuation mechanism in the form of a slide element 20 is arranged in bore 12 of base portion 3. The slide 20 is shown in more detail in FIG. 6 where it is seen to comprise a cylindrical body with a slotted central portion 21 for accomodating the shaped ends 16,17 of dogs 9,10 and the compression spring 18. The top portion 22 of slide 20 is threaded to accomodate a socket set screw 23 which abuts on the outer surface of shaped end 16 and the lower portion 24 of slide 20 is provided with a raised base section 25 which abuts on the outer surface of shaped end 17. Accordingly, for the fully retracted condition of chuck dogs 9,10 the actuating mechanism slide 20 is arranged with set screw 23 in its uppermost position. In this condition, the core elements C are readily mounted and/or removed from the chuck plug 2. In the instance where the chuck dogs 9,10 are needed to secure a core element C on the chuck plug 2, the actuation mechanism slide 20 is manipulated as shown in FIG. 5.

As shown in FIG. 5, the actuation slide mechanism 20 has been fully manipulated to force the ends 16,17 of chuck dogs 9,10 toward one another causing the chuck dogs to pivot about their pivotal connections 11,13 which in turn forces the sharpened ends 14,15 of the dogs into the inner surface of the core element C. For this purpose, the socket set screw 23 is turned within the threaded section 22 of slide 20 to urge the set screw towards the raised base section 25. This mechanical action tends to move the slide 20 upwards within the bore 12 at the same time as shown as the chuck dogs 9,10 pivot about their pivotal connections 11,13 and as the compression spring 18 is collapsed. When it is desired to move a core from the core chuck, the set screw 23 is reversed permitting the compression spring 18 to restore the chuck dogs 9,10 to their original retracted condition within the chuck plug slot 6.

Thus it may be seen that the unique chuck dog arrangement and actuation mechanism of the present invention provides a simple and expedient apparatus for securely fixing damaged or slightly oversized core elements to a core chuck with a minimum amount of effort and time. Further, even though only one specific embodiment of the invention has been fully disclosed, it should be understood that the invention is capable of other modifications and changes to accomodate specific requirements especially as outlined within the scope of the appended claims.

I claim:

1. A chucking device for engaging the hollow core of a web of material comprising:
   a. a tapered chuck plug consisting of a generally cylindrical and tapered body portion and an enlarged base portion;
   b. means for attaching the base portion of said tapered chuck plug to a rotatable spindle;
   c. an opening formed in the tapered end of said chuck plug comprising an elongated slot that extends internally of the chuck plug from its back portion to the extreme tapered end thereof where the slot opens into the surface face of said chuck plug;
   d. a pair of oppositely disposed core engaging elements pivotally mounted in said opening, said core engaging elements comprising a pair of chuck dogs which are pivotally mounted in said elongated slot at opposed sides of said chuck plug for movement from a normal retracted position within said chuck plug to a core engaging position exteriorly of said chuck plug, said chuck dogs being generally aligned with one another and consisting of angular elements that are sharpened at their core engaging ends and which have means at their opposite ends for accepting and retaining a compression spring device that normally biases the chuck dogs into their retracted position within the chuck plug slot; and,
   e. means located in said chuck plug for urging said chuck dogs into contact with the inside of a core placed on said chuck plug, said means comprising a slide element having an elongated cylindrical body with a slotted central portion for accomodating the opposite ends of said chuck dogs and said compression spring device located in said chuck plug base, said slide element further comprising a threaded upper portion which accomodates a set screw element and a solid lower portion having a raised base section wherein mechanical actuation of said set screw serves to overcome the compression spring bias to urge the sharpened ends of said chuck dogs into their core engaging position.

2. The chucking device of claim 1 wherein the set screw element abuts the outer surface of one of said chuck dogs at the compression spring retaining end thereof and the raised base section abuts the outer surface of the other of said chuck dogs at the compression spring retaining end thereof whereupon rotation of said set screw element in one direction urges the shaped ends of said chuck dogs toward one another against the compression force of said spring and rotation of the set screw element in the opposite direction permits the compressive force of said spring to urge the shaped ends of said chuck dogs away from one another.

* * * * *